United States Patent
Raasakka et al.

(10) Patent No.: US 6,805,828 B2
(45) Date of Patent: Oct. 19, 2004

(54) SUNROOF SUNSHADE

(75) Inventors: John Raasakka, Howell, MI (US); Gregory Kerwin, Howell, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/199,678

(22) Filed: Jul. 19, 2002

(65) Prior Publication Data

US 2003/0057608 A1 Mar. 27, 2003

Related U.S. Application Data

(62) Division of application No. 09/961,705, filed on Sep. 24, 2001, now abandoned.

(51) Int. Cl.[7] ............................................. B29C 45/00
(52) U.S. Cl. ................................ 264/328.1; 264/328.18
(58) Field of Search .......................... 264/328.1, 328.18, 264/328.12

(56) References Cited

U.S. PATENT DOCUMENTS

| 4,566,222 | A |   | 1/1986  | Hatvany |  |
|-----------|---|---|---------|---------|---|
| 4,717,200 | A |   | 1/1988  | Kruger  |  |
| 4,783,117 | A | * | 11/1988 | Nagata ................... 296/216.09 |
| 4,882,055 | A | * | 11/1989 | Stamstad ..................... 210/483 |
| 5,046,779 | A | * | 9/1991  | Ichinose et al. ....... 296/216.04 |
| 5,570,542 | A |   | 11/1996 | Cameron |
| 5,609,387 | A |   | 3/1997  | Stallfort et al. |
| 5,690,886 | A | * | 11/1997 | Kurihara ................ 264/328.12 |
| 5,763,050 | A | * | 6/1998  | Hirmer ....................... 428/174 |
| 5,768,826 | A | * | 6/1998  | Wilcher et al. ................ 49/61 |
| 6,179,034 | B1| * | 1/2001  | Fuss ........................... 160/105 |
| 6,244,653 | B1| * | 6/2001  | Nishio et al. .......... 296/216.09 |
| 6,315,356 | B1| * | 11/2001 | Tolinski ..................... 296/214 |
| 6,457,917 | B1| * | 10/2002 | Nomura et al. .......... 428/308.4 |

* cited by examiner

*Primary Examiner*—Michael P. Colaianni
*Assistant Examiner*—Monica A. Fontaine
(74) *Attorney, Agent, or Firm*—Carlson, Gaskey & Olds

(57) ABSTRACT

A sunroof sunshade assembly is provided for a vehicle that include spaced apart guide rails supported by a vehicle. The sunroof sunshade includes a frame including opposing lateral portions slidingly received in the guide rail with the lateral portions having a first thickness. An interior portion is integrally formed with the frame by a plastic injection molding process. The interior portion extends between the lateral portions with a plurality of tiny holes in a desired pattern and has a second thickness that is less than the first thickness to provide a simulated fabric mesh appearance. A finger cup may be formed in the frame to provide a recess by which a vehicle occupant may move the sunshade between the open and closed positions.

4 Claims, 2 Drawing Sheets

SUNROOF SUNSHADE

This application is a Divisional of U.S. application Ser. No. 09/961,705; filed on Sep. 24, 2001 now abandoned.

BACKGROUND OF THE INVENTION

This invention relates to a sunroof sunshade for a vehicle, and more particularly, the invention relates to an injection molded sunroof sunshade.

Sunroofs are a popular option for automobiles. Sunroof sunshades are frequently used in conjunction with a sunroof to block the sunlight entering through the sunroof. The sunshade is movable between open and closed positions along guide rails that are supported on the vehicle to block the sunroof opening.

One common type of sunshade utilizes a mesh fabric with numerous openings in the fabric to permit a limited amount of sunlight through the sunshade when the sunshade is in the closed position. The mesh is secured to a rigid rectangular frame, which is received between the guide rails. The frame typically includes two halves that are secured together, such as by an adhesive, with the mesh arranged between the two halves. Manufacture of this sunshade can be costly and somewhat difficult. For example, the sunshade must be assembled such that the mesh is held taught by the frame to provide a pleasing appearance. Moreover, using several components adds cost to the sunshade and additional labor. Therefore, what is needed is a non-mesh sunshade that is suitable for use in mesh sunshade applications are desired while utilizing fewer parts and less labor.

SUMMARY OF THE INVENTION AND ADVANTAGES

The present invention provides a sunroof sunshade assembly for a vehicle including spaced apart guide rails supported by a vehicle. The sunroof sunshade includes a frame including opposing lateral portions slidingly received in the guide rail with the lateral portions having a first thickness. An interior portion is integrally formed with the frame by a plastic injection molding process. The interior portion extends between the lateral portions with a plurality of tiny holes in a desired pattern and has a second thickness that is less than the first thickness to provide a simulated fabric mesh appearance. A finger cup may be formed in the frame to provide a recess by which a vehicle occupant may move the sunshade between the open and closed positions.

Accordingly, the above invention provides a non-mesh sunshade that is suitable for use mesh sunshade applications are desired while utilizing fewer parts and less labor.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
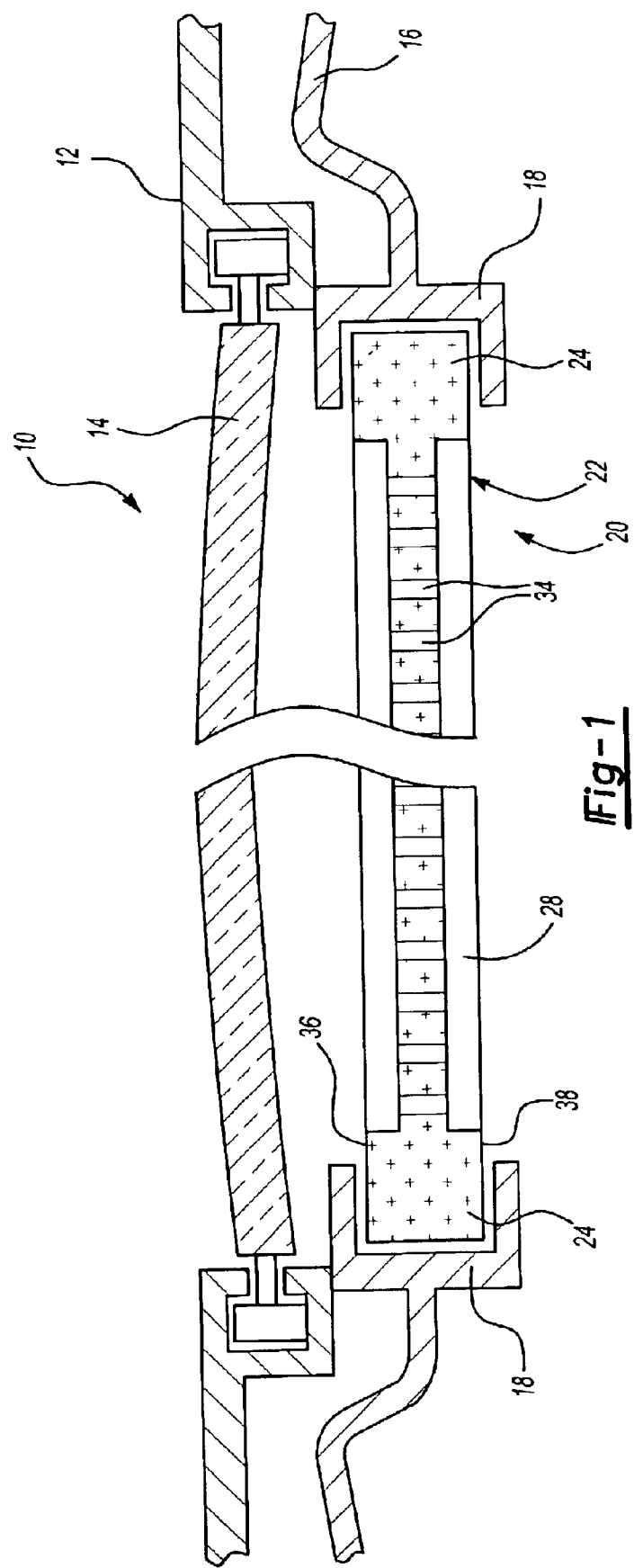
FIG. 1 is a cross-sectional view of a sunroof sunshade assembly of the present invention.

A sunroof sunshade assembly 10 is shown in FIG. 1. The assembly includes a vehicle body 12 having structure for supporting a sunroof 14. A headliner 16 secured to the vehicle body 12 on the interior of the vehicle. The headliner 16 may support guide rails 18 for receiving a sunshade 20. The sunshade 20 may be moved along the guide rails 18 between open and closed positions to permit or prevent light from shining through the sunroof 14 into the interior of the vehicle.

Figure 2:
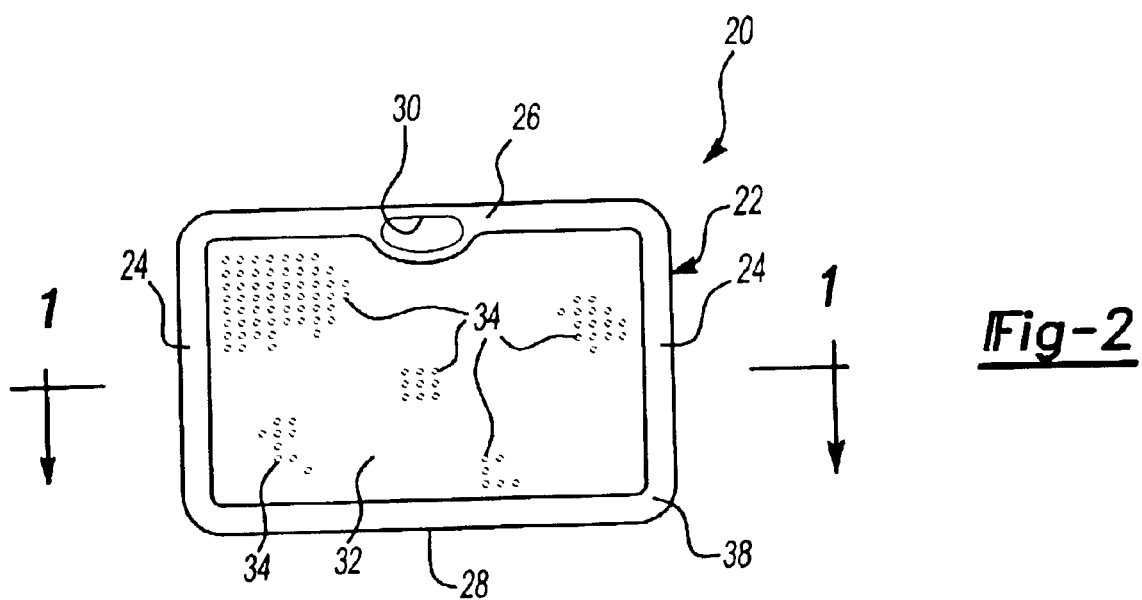
FIG. 2 is a bottom view of the sunroof sunshade of the present invention.

Referring the FIGS. 1 and 2, the present invention sunroof 14 may include a rectangular frame 22 that defines a perimeter of the sunshade. The frame 22 includes opposing lateral portions 24, and preferably, forward 26 and rearward 28 portions extending between the lateral portions 24. The bottom or interior side of the sunshade 20 is shown in FIG. 2. The forward portion 26 may include a recess or finger cup 30 by which a vehicle occupant may manipulate the sunshade 20 between open and closed positions.

The sunshade 20 includes an interior portion 32 extending interiorly of the frame 22. That is, the interior portion 32 is formed integrally with the frame 22 as a unitary structure. Said yet another way, the frame 22 and the interior portion 32 form a single component that does not require assembly. However, it is to be understood that additional components may be secured to the sunshade 20 as a part of the manufacture of the sunroof sunshade assembly 10.

The interior portion 32 may include a plurality of tiny holes 34 arranged in a desired pattern to provide a simulated mesh fabric appearance. In this manner, the present invention sunshade 20 is suitable for use in sunroof sunshade applications where mesh sunshades are typically used. The sunshade 20 may include upper 36 and lower 38 surfaces. Preferably, the interior portion 32 extends between the portions 26, 28, and 24 intermediate or in between the upper 36 and lower 38 surfaces to provide an appearance similar to common fabric mesh sunroof sunshades. However, it is to be understood that the interior portion 32 may be arranged in relation to the upper 36 and lower 38 surfaces in any desired manner.

Figure 3:
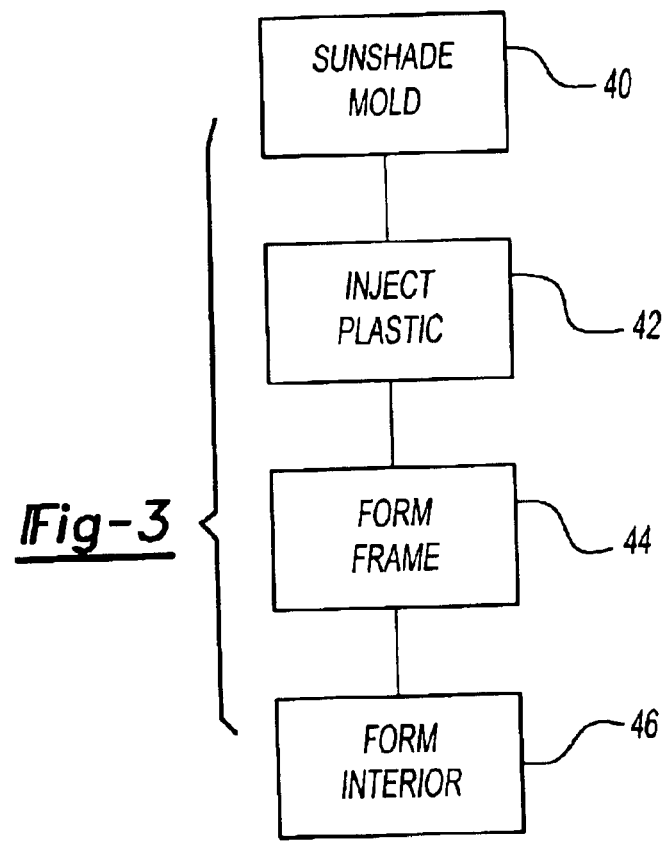
FIG. 3 is a flowchart of the present invention method of making a sunroof sunshade.

The sunroof sunshade 20 shown in FIGS. 1 and 2 may be manufactured by a process schematically depicted in FIG. 3. A mold suitable for plastic injection molding may be provided, as indicated at block 40. A plastic, which is preferably glass-filled, is injected into the mold 42. The mold defines a desired sunroof sunshade shape. Preferably, the plastic is UV stable and heat resistant and is at least semi-rigid when fully cured or hardened. The frame 22 and interior portion 32 are integrally formed as one structure, as indicated at blocks 44 and 46. The sunshade 20 is removed from the mold and cured or permitted to harden.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of manufacturing a sunroof sunshade comprising the steps of:
   a) providing a mold defining a desired sunshade shape;
   b) injecting a plastic material into the mold;
   c) forming a frame having a first thickness as part of the desired sunshade shape;
   d) forming an interior portion as part of the desired sunshade shape having a second thickness less than the first thickness extending between the frame, said interior portion including a plurality of holes in the interior portion arranged in a desired pattern; and e) removing the sunshade from the mold.

2. The method according to claim 1, wherein the plastic of step b) is at least semi-rigid after hardening.

3. The method according to claim 2, wherein the plastic of step b) is glass-filled.

4. The method according to claim 1, wherein step c) includes forming a finger cup in the frame.

* * * * *